United States Patent [19]

Reynolds et al.

[11] E Re. 29,666

[45] Reissued June 13, 1978

[54] ELECTRICAL CONTACT TERMINAL HAVING IMPROVED WIRE-RECEIVING SLOT

[75] Inventors: Charles Edward Reynolds, Mechanicsburg; John Clinton Swartz, Harrisburg, both of Pa.

[73] Assignee: AMP Incorporated, Harrisburg, Pa.

[21] Appl. No.: 772,207

[22] Filed: Feb. 25, 1977

Related U.S. Patent Documents

Reissue of:

[64] Patent No.: 3,972,578
Issued: Aug. 3, 1976
Appl. No.: 569,421
Filed: Apr. 18, 1975

[51] Int. Cl.[2] ..... H01R 3/04

[52] U.S. Cl. ..... 339/15; 174/47; 339/221 L

[58] Field of Search ..... 339/15, 16 R, 76 C, 339/16 RC, 221 L; 174/47

[56] References Cited

U.S. PATENT DOCUMENTS

| | | | |
|---|---|---|---|
| 3,034,085 | 5/1962 | Pauler et al. | 339/16 R |
| 3,127,227 | 3/1964 | Edwards | 339/15 |
| 3,928,715 | 12/1975 | Holden | 339/15 X |

*Primary Examiner*—Roy Lake
*Assistant Examiner*—DeWalden W. Jones
*Attorney, Agent, or Firm*—Frederick W. Raring; William J. Keating; Jay L. Seitchik

[57] ABSTRACT

Connecting device, which may be used for the spring member of a flexible hose, comprises a web having parallel sidewalls extending therefrom. Wire-receiving slot means extend inwardly from the free edges of the sidewalls and contact portion extends forwardly from the web so that when a wire spring in a flexible hose is inserted into the slot, the connecting device will extend from the end of the hose and parallel to the axis thereof. The wire-receiving slot means has features which make it particularly suitable for spring steel wires.

4 Claims, 11 Drawing Figures

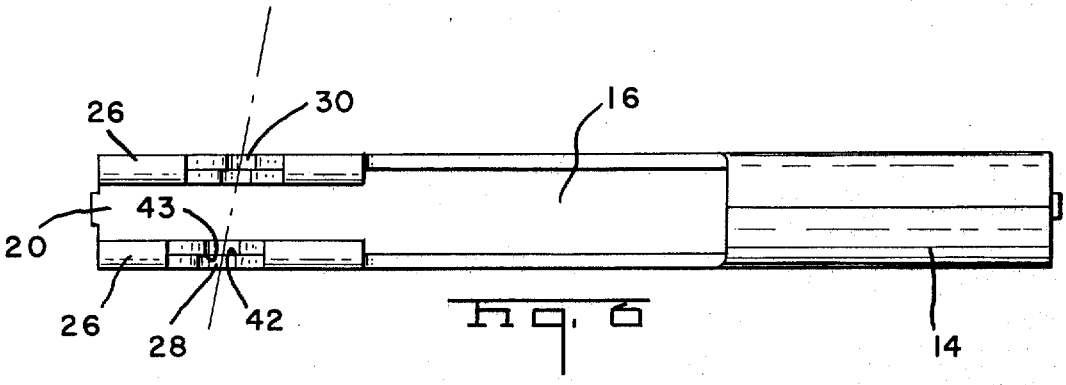
Fig. 6
Fig. 7
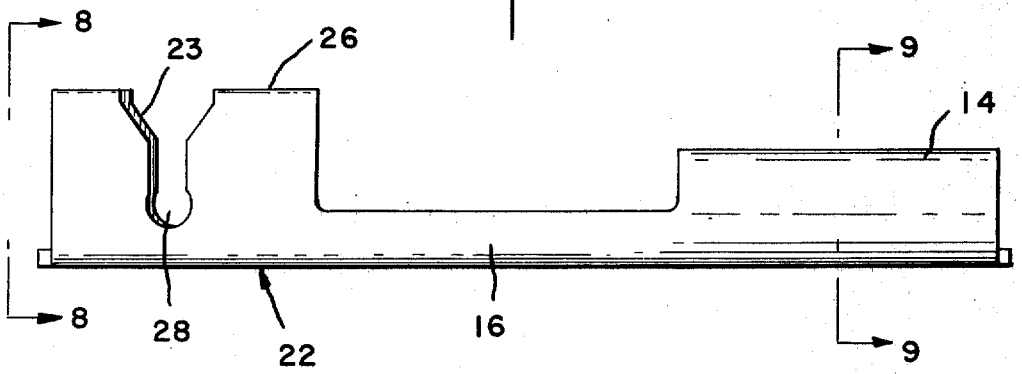
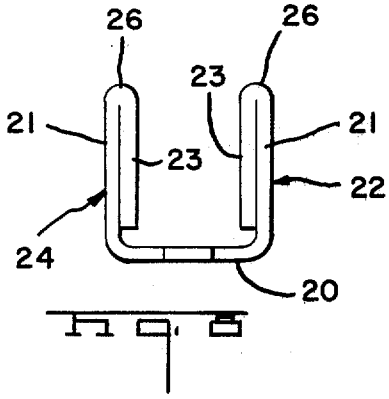
Fig. 8

ELECTRICAL CONTACT TERMINAL HAVING IMPROVED WIRE-RECEIVING SLOT

Matter enclosed in heavy brackets [ ] appears in the original patent but forms no part of this reissue specification; matter printed in italics indicates the additions made by reissue.

BACKGROUND OF THE INVENTION

This invention relates to connecting devices of the type having a conductor-receiving slot such that an electrical connection is established by moving the conductor into the slot. The embodiment of the invention disclosed herein is particularly intended for use with a flexible hose having a helical wire spring but other uses for the invention will be apparent from the following detailed description.

Flexible hoses of the type with vacuum cleaners to convey refuse from the nozzle of the cleaner to the canister thereof commonly comprise a helical wire spring which supports a film of supple plastic. In some types of vacuum cleaners, it is desirable to provide an electric motor in the nozzle, for example, to operate a brush so that the surface being cleaned will be brushed during the vacuuming operation. It is common practice to use the flexible wire spring of the hose as a conductor means for supplying current to the motor as shown, for example, in U.S. Pat. Nos. 3,314,039, 3,546,656, 3,198,873 and in other issued U.S. Patents.

The helical wire springs used in these flexible wire hoses must be of a material such as a spring steel having good strength and spring properties and the achievement of electrical connections to the springs presents an unusual problem. For this reason, the electrical connections used in the past are of unusual types and are sometimes expensive and inconvenient.

In accordance with the practice of the instant invention, a terminal having a wire receiving slot means is provided and the terminal is connected to the wire by simply inserting the wire into the slot means of the terminal. However, and because of the fact that relatively hard steel wires are involved rather than conventional softer copper wires, wire receiving slots of known types are not suitable for the problem to which the instant invention is addressed. Wire-receiving slot means in accordance with the invention overcome the deficiencies of previously known wire slots.

It is accordingly an object of the invention to provide an improved electrical terminal. A further object is to provide a terminal having an improved wire-receiving slot means which is suitable for use on steel wires or wires of other relatively hard materials. A further object is to provide a terminal which can be applied to the spring steel coil springs in a flexible hose with a minimum of preparation of the ends of the hose.

These and other objects of the inventon are achieved in a preferred embodiment thereof which is described briefly in the foregoing abstract, which is described in detail below and which is shown in the accompanying drawing in which:

FIGS. 6 and 7 are top plan and side views of the terminal respectively.

FIG. 8 is a view taken along the lines 8—8 of FIG. 7.

Figure 1:
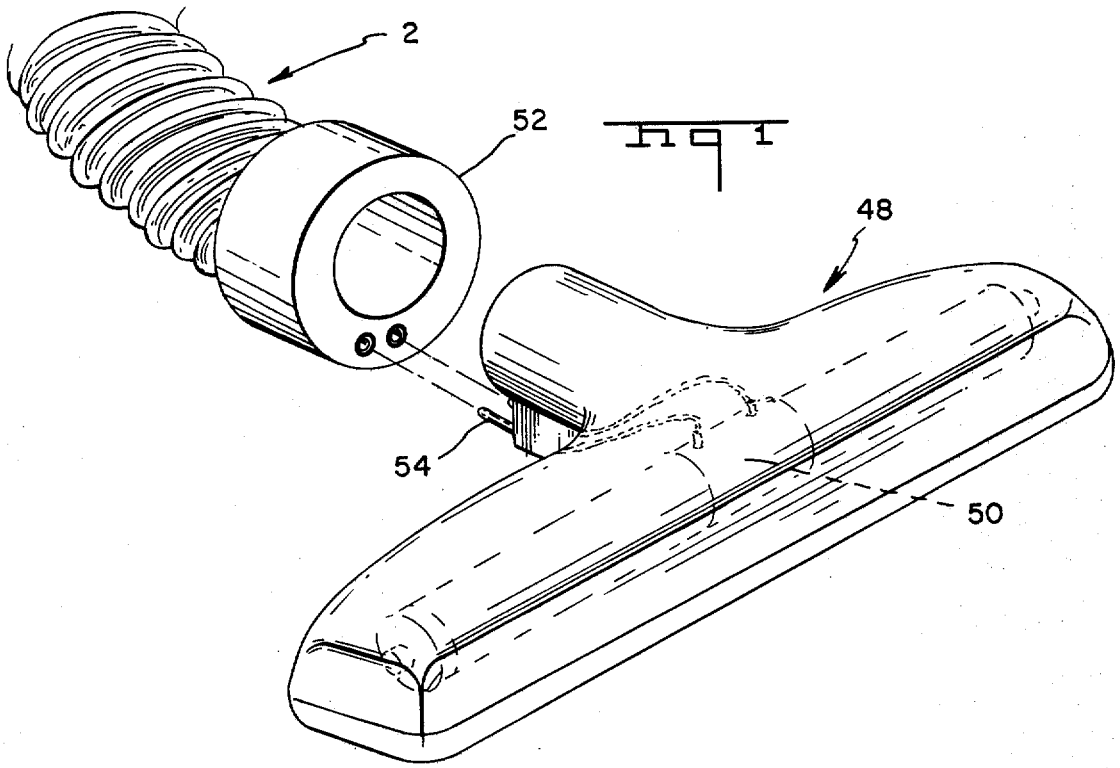
FIG. 1 is a perspective exploded view of the end portion of a vacuum cleaner hose with the nozzle exploded therefrom.
Figure 2:
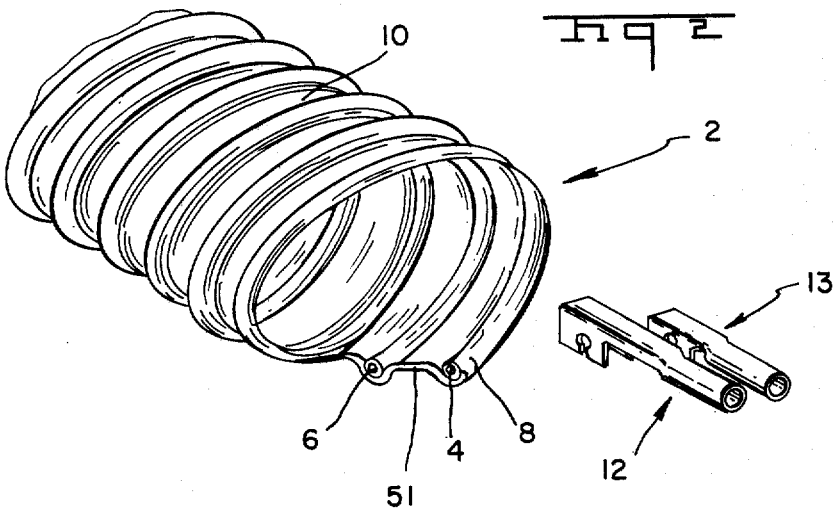
FIG. 2 is a perspective view of an end portion of a hose which has been prepared for application thereto of terminals in accordance with the invention.
Figure 4:
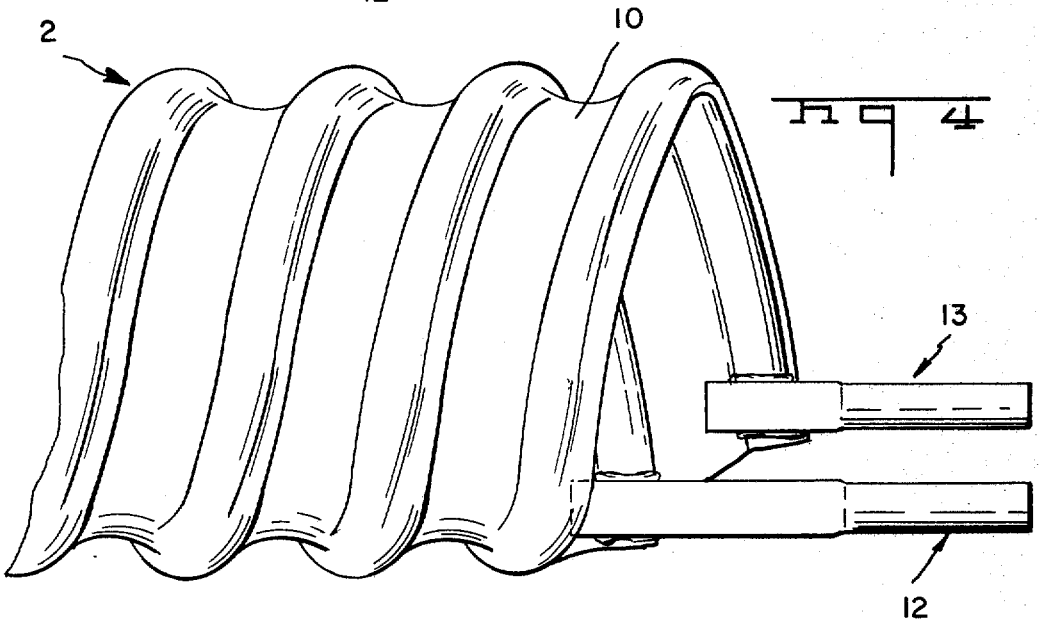
FIG. 4 is a side view of the hose of FIG. 3.

Referring first to FIG. 2, a typical flexible hose 2 of the type used for canister vacuum cleaners comprises two helical spring members 4, 6 which are arranged on a common axis with the turns of each spring member extending between the turns of the other spring member. The spring members 4, 6 are provided with an insulating sheath 8 and they function as a support for the generally tubular casing 10 which is usually of a relatively thin, pliant plastic film, for example, a suitably plasticized polyvinylchloride. As shown in FIG. 4, the film 10 is not taut but undulates between adjacent turns of the spring members so that the hose can be flexed without rupture of the film. It is necessary to provide two spring members 4, 6 when the nozzle 48 of the cleaner contains a motor 50 as shown in FIG. 1 in order to provide two conductors for the motor connections.

Figure 5:
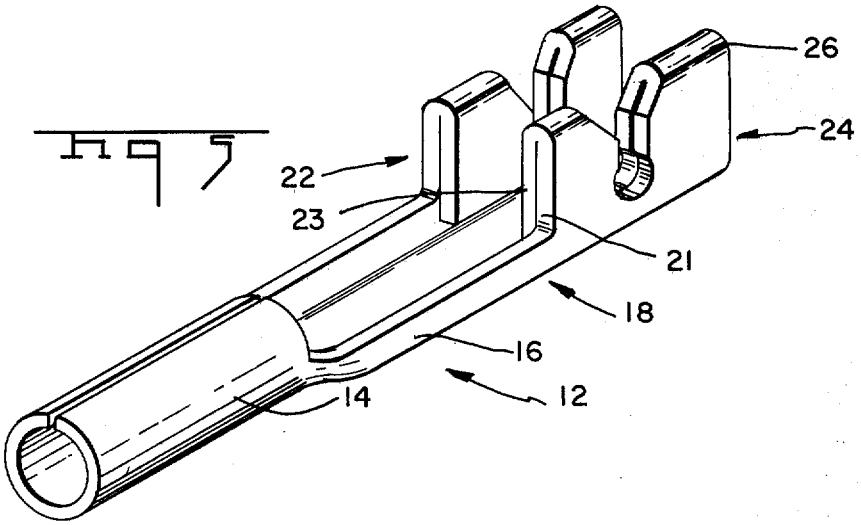
FIG. 5 is a perspective view of a preferred form of terminal in accordance with the invention.

A connecting device 12, FIG. 5, in accordance with the invention comprises a generally cylindrical socket portion 14, a wire-receiving portion 18, and an intermediate channel-shaped shank portion 16. The wire-receiving portion 18 is U-shaped as shown in FIG. 8 and has a flat web 20 from which parallel sidewalls 22, 24 extend. Each sidewall is folded as shown at 26 to provide two plate-like sections 21, 23 which form a dual thickness of metal in these portions of the terminal and to achieve an improved wire-receiving slots as will be explained below.

Figure 11:
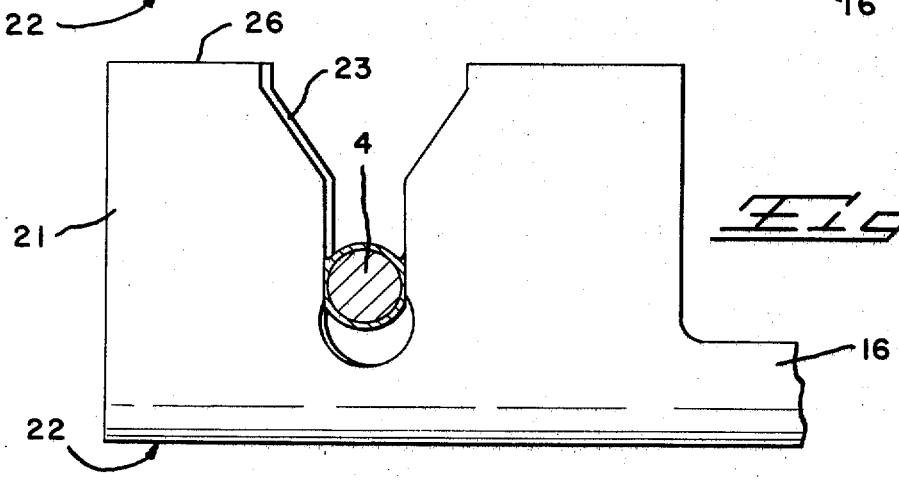

Each sidewall has a wire-receiving slot means extending downwardly therein from its fold 26 as shown at 28 and 30. Each slot means comprises a slot in each of the two plate-like sections 21, 23. As shown in FIG. 11, the slots in the two plate-like sections of each sidewall 22, 24 are offset from each other and as shown in FIG. 6, the two slot means 28, 30 in the two composite sidewalls 22, 24 are also offset from each other.

Figure 9:
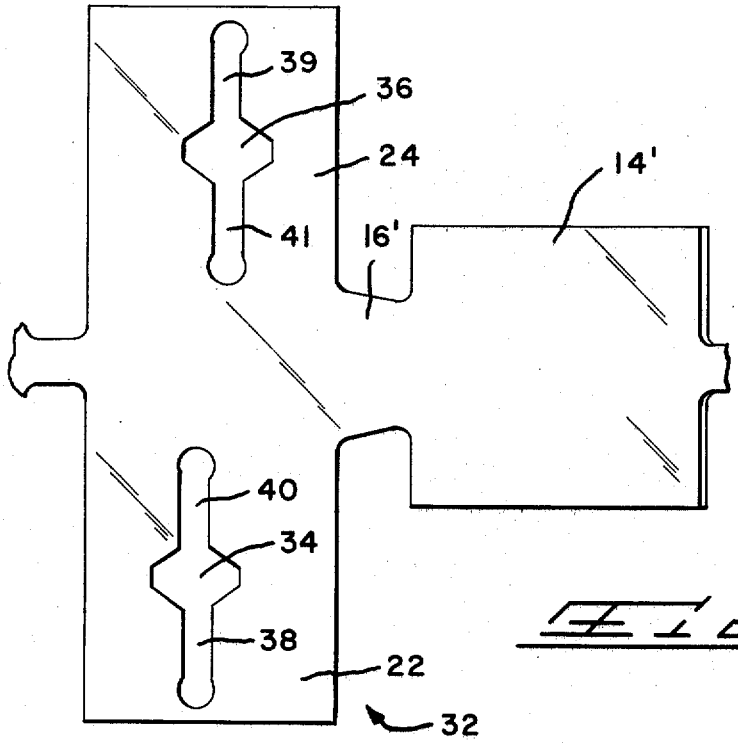
FIG. 9 is a plan view of the blank from which the terminal of FIG. 5 is formed.

Terminals in accordance with the invention are the manufactured in strip form from a suitable conductive material such as a No. 4 hard brass. The blank from which the terminal is formed 32, FIG. 9, has a rectangular porton 14' at its leading end, an intermediate connecting neck section 16' and laterally extending wing-like portions 22', 24'. It will be apparent that the sections indicated with the primed reference numerals ultimately are formed into the corresponding sections of the finished terminal having unprimed reference numerals.

The blank 32 has punched holes 34, 36 in each of the laterally extending sections 22' 24', the holes being generally diamond shaped and having laterally extending portons 38, 40. It will be apparent from FIG. 9 that the lateral extension 40 of the hole 34 is slightly offset from the extension 38 of the same opening and this offset relationship exists with regard to the openings 41 and 39 of the hole 36. Because of this offset relationship of the extensions on each side of the holes 34, 36, each of the wire-receiving slot means 28, 30, is stepped as shown at 42, 43 in the slot 28 (FIG. 6). These steps or offsets provide sharp edges which permit the terminal to be applied to hard steel wires as will be described below.

Figure 3:
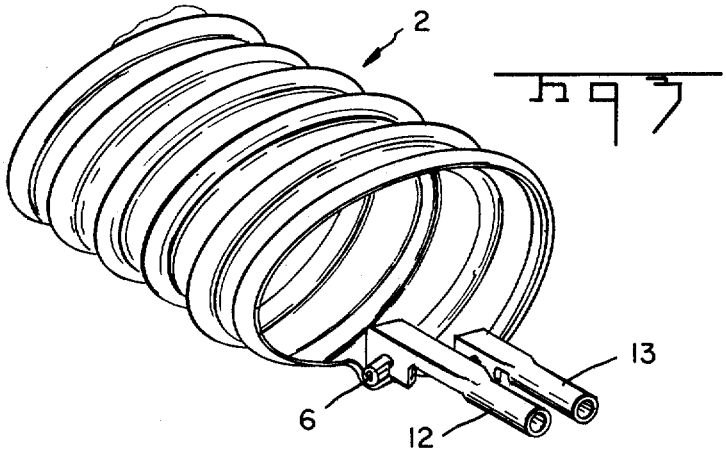
FIG. 3 is a view similar to FIG. 2 but showing the terminals applied to the helical wire springs of the hose.

Referring again to FIG. 2, it is sometimes desirable to use one relatively large terminal 12 and a somewhat shorter terminal 13 in the termination structure. The conductor receiving portions of the two terminals may be identical so that, excepting for the fact that their shanks are of different lengths, the terminals are identical to each other. When the terminals 12, 13 are to be applied to the end of the hose, the end of the hose is cut along a line 51 which extends diagonally with reference to the conductors so that the conductor 6 extends helically for a short distance beyond the end of the conductor 4. The terminals are then positioned adjacent to the ends of the conductors and within the hose and moved relatively outwardly towards the conductors until the conductors enter the slots as shown in FIG. 3. This operation of applying the terminals can be carried out with a hand tool or with a suitable bench-type terminal applicator.

It is desirable to provide a protective structure for the terminals on the end of the hose, for example, a protective ring 52 so that when the hose is coupled to the nozzle, the terminals will be mated with complementary terminals 54 in the nozzle. A more complex housing structure may be provided on the end of the hose if desired.

As previously mentioned, the springs 4, 6 of the hose 2 are usually of a spring steel which is quite hard as compared with the materials, such as brass, from which terminals are usually manufactured. The springs 4, 6 are commonly plated with copper when the springs are being used as conductors but it is necessary to form a mechanical connection with the wire when the terminal is applied as well as an electrical connection.

Conventional wire-in-slot type connecting devices are not suitable for hard spring steel wires for the reason that in a conventional wire-in-slot electrical connection, the relatively soft copper wire is plastically deformed when it is inserted into the slot of the somewhat harder terminal (brass or berillum copper). As a result of this relationship of a soft wire and a harder terminal, the plastic deformation takes place in the wire and good electrical contact is obtained along with a mechanical connection of the wire to the terminal. If however, a hard wire of spring steel is inserted into the slot of a terminal of brass or similar material, the wire will not be significantly deformed but will rather cause deformation of the brass and the resulting connection might be mechanically tenuous and electrically insufficient.

Figure 10:
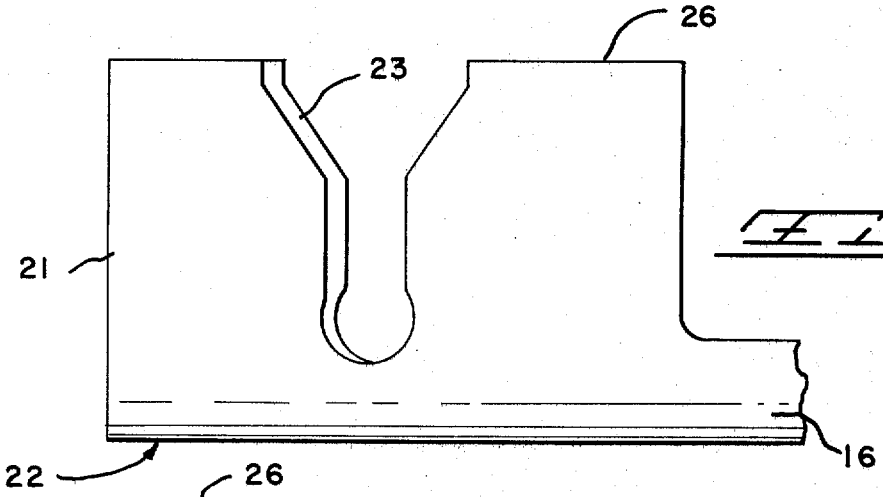
FIGS. 10 and 11 are views illustrating the principle of one aspect of the invention.

In accordance with the instant invention, as shown in FIGS. 10 and 11, the individual slots in the plate like sections 21, 23 of each sidewall are offset from each other so that when a hard steel wire is inserted, the plate-like sections can move in their own planes relative to each other. The hard steel wire causes such movement as illustrated in FIGS. 10 and 11 and in doing so, the folds are resiliently stressed and they function as spring members or spring biased hinges which urge the edges of the slots in the individual plate like sections 21–23 against the wire. Inspection of terminals which have been removed from the end of a hose show that, in fact, the surface of the brass of the terminal may be somewhat deformed by the wire but the spring action of the resiliently deformed plate-sections 26 on the wires maintains intimate contact. The copper coating on the wire is, of course, deformed during insertion and is maintained in intimate contact with the brass surfaces of the terminal to provide the electrical connection.

For optimum results in the practice of the invention, the dimensions of the sots relative to the diameter of the wire should be carefully determined. It has been found, for example, that good results will be obtained if each slot in each plate-like section 21, 23 has a width which is substantially equal to the diameter of the steel core of the wire and less than the overall diameter of the wire including the copper plating thereon. These dimensional relationships, coupled with the slight offset of the slots in plate-like sections 21, 23 ensure that the copper plating will be penetrated to establish the electrical connection and the plate-like sections 21, 23 will be slightly displaced relative to each other to obtain the electrical connection. It will be apparent that if each slot in each plate-like section has a width which is equal to the diameter of the steel core, the distance between the edges 42, 43 will be less than the diameter of the steel core and movement of the plate-like sections will take place. This movement may be accompanied by some permanent or plastic deformation of the edges 42, 43 because of the fact that the brass is softer than the steel as noted above.

The offset slot means 28, 30 in the composite sidewalls 22, 25 ensures that the wire will extend diagonally through the slots in each of the plate-like sections 21, 23 of each sidewall. This relationship thereby encourages the relative movement of the plate-like sections as described above.

It will be noted that the outer ends of the extensions 38, 40, and 39, 41 are circular and have a radius which is very slightly greater than the widths of the openings. This feature improves the resistance of an inserted wire to removal upon application of a tensile pull on the wire parallel to the axis of the terminal. The improvement is especially noticeable when the wire is a helical spring, probably because of the complex stresses introduced in the spring when the tensile pull is applied.

It will be apparent that the folded plate concept in combination with the offset slots in each plate section can be used under many circumstances where an electrical and mechanical connection must be made to a hard steel wire. For example, if a conventional terminal having a contact porton which is in alignment with the wire is requested, one or more folded plate sections of the type incorporated into each of the sidewalls 22, 24 can be provided one behind the other on the end of, and in alignment with the contact portion of the terminal.

What is claimed is:

[1. A flexible hose in combination with electrical conductor means:

said hose comprising a tubular casing of thin-walled supple material having a helical wire spring member therein, said spring being in supporting relationship to said tubular casing, said spring member constituting said conductor means, said conductor means having a terminal on one end thereof, said terminal having a generally U-shaped conductor-receiving portion which has a bight and sidewalls, said sidewalls having parallel free ends which are remote from said bight, wire-receiving slot means extending inwardly from said free edges towards said bight, said terminal having contact means integral with, and extending from, said conductor receiving portion, said conductor being received in said slot means whereby edge portions of said slot means are in electrical contact with said conductor.]

[2. The combination set forth in claim 1, each of said sidewalls being folded along a fold line extending parallel to said bight to define a fold, said folds constituting said free edges and each sidewall comprising a pair of parallel side-by-side plate-like sections, said slot means in each sidewall comprising a slot in each of said plate-like sections.]

[3. The combination set forth in claim 2, said slots in each of said plate-like sections in each of said sidewalls being displaced in their own planes by said wire, said fold in each of said sidewalls being resiliently stressed and serving as a spring urging edge portions of said slots into engagement with said wire.]

[4. The combination set forth in claim 3, said slot means in one of said sidewalls being offset with respect to said slot means in the other one of said sidewalls.]

[5. The combination set forth in claim 1, said contact portion extending from said conductor-receiving portion in a direction parallel to the axis of said hose.]

[6. The combination set forth in claim 5, and a second helical wire spring member in said tubular casing, said second spring member constituting a second conductor, said second conductor being displaced in the direction of the axis of said hose from said conductor, and a second terminal which is similar to said terminal, said second terminal being connected to said second conductor at said one end of said hose.]

[7. First and second electrical conductors in combination with a flexible hose:

said hose comprising a tubular casing, said casing being of a thin-walled supple material, said first and second conductors comprising first and second wire coil springs, each of said springs having spaced apart coils, said springs being disposed in said casing and supporting said casing, the coils of said first spring being between the coils of said second spring.

said first conductor having an end coil which defines one end of said hose, said first and second conductors each having a tip portion at said one end of said hose, said tip portion of said second conductor being located beyond said tip portion of said first conductor in the direction which said one end coil extends towards said one end of said hose, and first and second electrical contact terminals secured to said tip portions of said first and second conductors respectively, said terminals extending from said tip portions away from said one end and parallel to the axis of said hose, each of said terminals having a generally U-shaped conductor receiving portion, said conductor-receiving portion having a bight and sidewalls, said sidewalls having parallel free edges which are remote from said bight, each of said sidewalls having a slot means extending from its free edge towards said bight, said tip portions of said conductors being received in said slot means.]

[8. An electrical contact terminal intended for application to one end of a coil spring conductor, said terminal comprising:

a conductor-receiving portion and a contact portion, said conductor-receiving portion being generally U-shaped in cross section and comprising a web and sidewalls, said contact portion extending from said web at one end thereof, said sidewalls having parallel free edges which are remote from said web, each of said sidewalls having a wire-receiving slot means extending therein from its free edge towards said web whereby, upon insertion of an end portion of said coil spring into said slot means, edge portions of said slot means will engage, and establish electrical contact with said wire, and said contact portion will extend from said contact portion parallel to the axis thereof.]

[9. A terminal as set forth in claim 8, said sidewalls each being reversely folded along fold lines which extend parallel to said web thereby to provide a pair of parallel plate-sections connected by a fold, said fold in each sidewall constituting the free edges thereof, said slot means in each sidewall comprising a slot in each of said plate sections, said slots in each sidewall being offset from, and overlapping, each other.]

[10. The combination set forth in claim 1 said terminal being located interiorly of said hose.]

*11. In an electrical contact terminal of the type intended for application to one end of a coil spring conductor, said terminal being of the type comprising a conductor-receiving portion and a contact portion, said conductor-receiving portion being generally U-shaped in cross-section and comprising a web and sidewalls, said contact portion extending from said web at one end thereof, said sidewalls having parallel free edges which are remote from said web, each of said sidewalls having a wire-receiving slot means extending therein from its free edge towards said web, the improvement to said terminal comprising:*

*a reverse fold in each of said sidewalls extending parallel to the axis of said conductor-receiving portion whereby each of said sidewalls comprises a pair of parallel plate-sections connected by one of said folds, said fold in each sidewall constituting said free edge thereof, said slot means in each sidewall comprising a slot in each of said plate-sections, whereby,*

*upon insertion of an end portion of said coil spring into said slot means, edge portions of said slot means will engage, and establish electrical contact with said wire, and said contact portion will extend from said contact portion parallel to the axis thereof.*

*12. A contact terminal as set forth in claim 11, said slot in each of said plate sections of each sidewall being offset from, and overlapping the slot in the other plate section of the same sidewall.*

*13. An electrical contact terminal as set forth in claim 11, said slot means in each of said sidewalls being offset relative to said slot means in the other one of said sidewalls.*

*14. A helical spring steel conductor in combination with an electrical contact terminal, said terminal having a generally U-shaped conductor-receiving portion which has a bight and sidewalls, said sidewalls having parallel free edges which are remote from said bight, wire-receiving slot means extending inwardly from said free edges towards and bight, said terminal having contact means integral with, and extending from, said conductor-receiving portion, said conductor being received in said slot means, the improvement to said terminal comprising:*

*a reverse fold in each of said sidewalls extending parallel to the axis of said conductor-receiving portion whereby each of said sidewalls comprises a pair of parallel plate-sections connected by one of said folds, said fold in each sidewall constituting said free edge thereof, said slot means in each sidewall comprising a slot in*

*each of said plate-sections, said slot in each of said plate-sections of each sidewall being normally offset from, and overlapping, the slot of the other plate-section of the same sidewall, said slot in each plate-section of each sidewall being displaced relatively towards the slot in the other plate section of the same sidewall by said wire, and said folds of each sidewall being resiliently stressed whereby edge portions of said slot means are resiliently urged against said wire to maintain electrical contact therewith.*

* * * * *